US 6,807,002 B2

United States Patent
Yoon

(10) Patent No.: US 6,807,002 B2
(45) Date of Patent: Oct. 19, 2004

(54) PLANAR LIGHTWAVE CIRCUIT TYPE OPTICAL AMPLIFIER

(75) Inventor: Young-Kwon Yoon, Anyang-shi (KR)

(73) Assignee: Samsung Electronics Co., LTD, Suwon-si (KR)

(*) Notice: Subject to any disclaimer, the term of this patent is extended or adjusted under 35 U.S.C. 154(b) by 135 days.

(21) Appl. No.: 10/190,189

(22) Filed: Jul. 5, 2002

(65) Prior Publication Data

US 2003/0099029 A1 May 29, 2003

(30) Foreign Application Priority Data

Oct. 12, 2001 (KR) .......................................... 2001-62880

(51) Int. Cl.[7] .............................................. H01S 3/00
(52) U.S. Cl. ...................................... 359/346; 359/333
(58) Field of Search .................................. 359/346, 333

(56) References Cited

U.S. PATENT DOCUMENTS 5,446,573 A * 8/1995 Lomashevitch ............. 359/158

OTHER PUBLICATIONS

Kuwabara Hideo, Publication No. 59061979, Apr. 9, 1984, "Unilateral Light Amplifier", Abstract.
Kuwabara Hideo, Publication No. 59117283, Jul. 6, 1984 "Optical Amplifier Having Single Directivity", Abstract.
Oshima Masaaki, Publication No. 61137387, Jun. 25, 1986, "Semiconductor Lazer", Abstract.
Koga Yuji, Publication No. 04084129, Mar. 17, 1992, Semiconductor Wavelength Filter, Abstract.
Okada Kenji, Publication No. 61046084, Mar. 6, 1986, "Optical Amplifier", Abstract.
Lasers and Electro–Optics Society Annual Meeting, 1997, Kuninori Hattori, Er=Doped Planar Waveguide Devices, pp. 308–309.
IEEE Photonics Technology Letters, Nov. 1, 1992, Senichi Suzuki et al., "Integrated–Optic Ring Resonators With Tow Stacked layers of Silica Waveguide on Si", vol. 4, No. 11.

* cited by examiner

Primary Examiner—Mark Hellner
(74) Attorney, Agent, or Firm—Cha & Reiter, LLC

(57) ABSTRACT

A PLC type optical amplifier is provided. In the PLC type optical amplifier, an amplification layer is formed of a light amplifying material on a semiconductor substrate at a side of a core layer, spaced from the core layer. The amplification layer forms an annular light path. Thus, optical signals are coupled between the core layer and the amplification layer.

20 Claims, 6 Drawing Sheets

PLANAR LIGHTWAVE CIRCUIT TYPE OPTICAL AMPLIFIER

CLAIM OF PRIORITY

This application makes reference to and claims all benefits accruing under 35 U.S.C. Section 119 from an application entitled "Planar Lightwave Circuit Type Optical Amplifier" filed in the Korean Industrial Property Office on Oct. 12, 2001 and assigned Serial No. 2001-62880, the contents of which are hereby incorporated by reference.

BACKGROUND OF THE INVENTION

1. Field of the Invention

The present invention relates generally to an optical amplifier. More particularly, the present invention relates to a Planar Lightwave Circuit (PLC) type optical amplifier.

2. Description of the Related Art

Optical signal amplification using an Erbium-Doped Fiber Amplifier (EDFA) in an optical communication system provides dramatic cost reductions associated with the implementation of the optical communication system. In addition, the use of EDFA also contributes substantially to the increase in optical communication efficiency. In the future, optical amplification technology is expected to be subsequently developed toward the application of EDFAs to PLCs, known as erbium-doped waveguide amplifiers (EDWAs). Studies have been conducted actively in order to put the EDWAs to practical use because they enable the integration of complex optical devices.

However, such a PLC type optical amplifier doped with rare earth metal ions, such as erbium or transition metal ions, has a low amplification rate per unit length. Therefore, the PLC type optical amplifier has limitations in achieving both a desired amplification rate and high integration.

SUMMARY OF THE INVENTION

It is, therefore, an aspect of the present invention to provide a PLC type optical amplifier that ensures a high amplification rate and high integration.

The above and other aspects of the present invention are achieved by providing a PLC type optical amplifier comprising an amplification layer formed of a light amplifying material on a semiconductor substrate at a side of a core layer, and spaced from the core layer. The amplification layer forms an annular light path. Thus, optical signals are coupled between the core layer and the amplification layer.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

Figure 1:
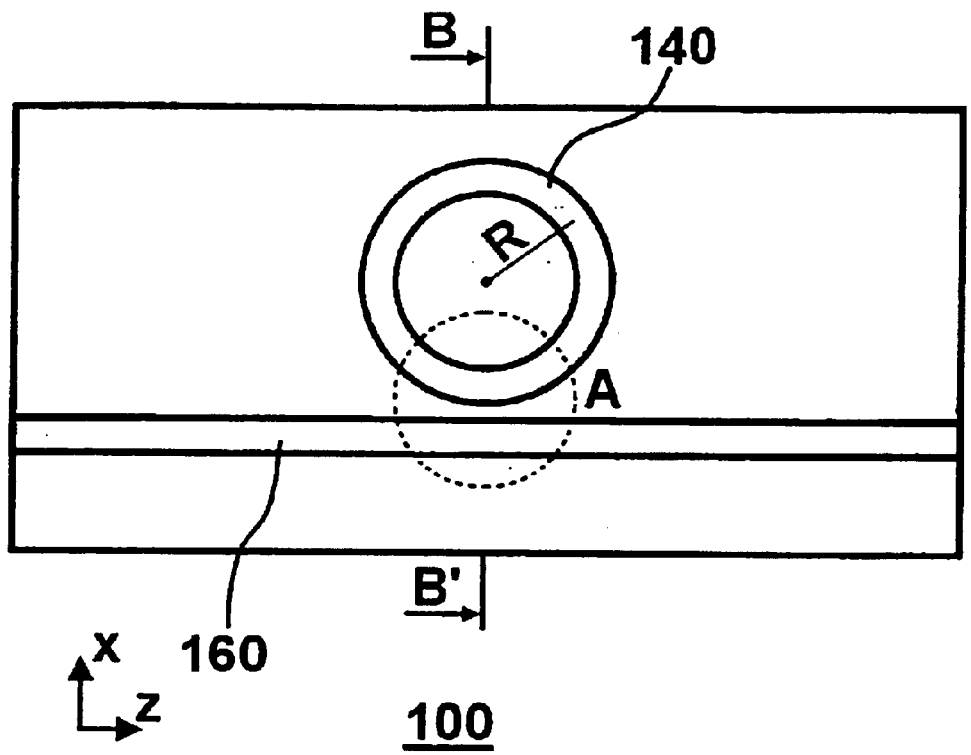
FIG. 1 is a schematic frontal view of a PLC type optical amplifier according to a preferred embodiment of the present invention.
Figure 2:
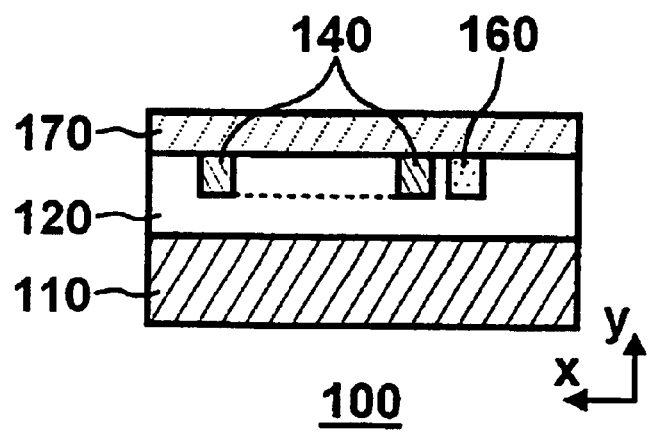
FIG. 2 is a side sectional view of the PLC type optical amplifier illustrated in FIG. 2, taken along line B–B'.

FIGS. 1 and 2 are a schematic frontal view of a PLC type optical amplifier according to a preferred embodiment of the present invention, and a side sectional view of the PLC type optical amplifier illustrated in FIG. 1, taken along line B–B', respectively. Referring to FIGS. 1 and 2, a PLC type optical amplifier 100 includes a semiconductor substrate 110, a lower clad layer 120, a core layer 160, an amplification layer 140, and an upper clad layer 170 that are sequentially deposited on the semiconductor substrate 110.

The core layer 160 is formed of erbium-doped silica. An optical signal input through an end of the PLC type optical amplifier 100 is propagated along the core layer 160.

The amplification layer 140 is also formed of erbium-doped silica and is disposed close enough to the core layer 160 so as to permit the coupling of optical signals between the amplification layer 140 and the core layer 160. The amplification layer 140 is formed in an annular shape and has a gain coefficient g per unit length. The amplification layer 140 amplifies an optical signal coupled inward toward a coupling region C (shown in FIG. 3). Due to the annular shape of the amplification layer 140, the amplified optical signal passes through the coupling region again, partially being coupled to the core layer 160.

The lower and upper clad layers 120 and 170 are formed of silica and serve to prevent loss of the optical signals by confining the signals to the core layer 160 and the amplification layer 140 by surrounding them. Thus, the optical signals are coupled between the core layer 160 and the amplification layer 140 only in the coupling region.

Figure 3:
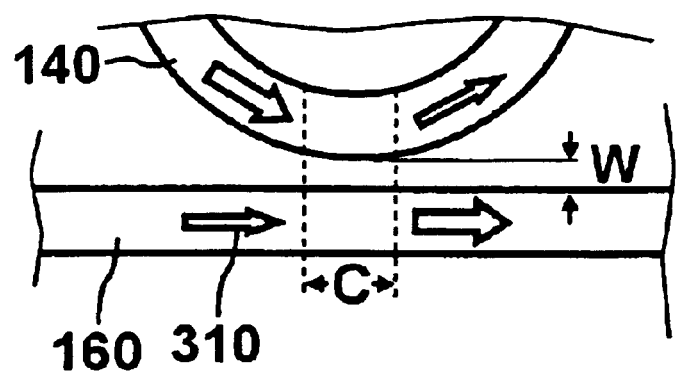
FIG. 3 is an enlarged frontal view of a portion A of the PLC type optical amplifier illustrated in FIG. 1.

FIG. 3 is an enlarged frontal view of a portion A of the PLC type optical amplifier 100 illustrated in FIG. 1. Referring to FIG. 3, an optical signal 310 input through an end of the PLC type optical amplifier 100 travels in the core layer 160. Passing through a coupling region C, the optical signal 310 is partially coupled to the amplification layer 140. The coupling coefficient t of the optical signal 310 is determined by the distance W between the core layer 160 and the amplification layer 140, the refractive index distribution of the coupling region C defined by the core layer 160, the amplification layer 104, and the lower clad layer 120, and the length of the coupling region C.

The coupled optical signal 310 is amplified, going around the annular amplification layer 140 and then fed back to the coupling region C again. Part of the optical signal 310 is coupled to the core layer 160 and the remaining optical signal goes around the amplification layer 140 again. The distance the optical signal 310 covers at one round trip in the amplification layer 140, that is, the length of the amplification layer L is defined as $(2\pi \times R)$.

After such repeated amplification, the intensity I of the optical signal 310 output from the core layer 160 is calculated by:

$$I = (1-t)I_0 + t^2 I_0 G + (1-t)t^2 I_0 G^2 + (1-t)^2 t^2 I_0 G^3 + \quad (1)$$
$$(1-t)^4 t^2 I_0 G^4$$
$$= (1-t)I_0 + t^2 I_0 G / [1 - (1-t)G]$$

where t is a coupling efficient between the core layer 160 and the amplification layer 140, $I_0$ is the intensity of the optical signal 310 input to the core layer 160, and $G(=\exp(gL))=\exp(2\pi \times g \times R)$ is a gain rate of the optical signal 310 after one round trip.

If the coupling coefficient t is set to about 1, the effective amplification rate $G_{eff}$ of the PLC type optical amplifier 100 is expressed as:

$$G_{eff}=G/[1-rG]$$

Where r(=1−t) is a non-coupling coefficient. As noted from Equation (2), with the gain rate G given, a greater effective amplification rate $G_{eff}$ than the gain rate G can be achieved by appropriately controlling the value r.

FIGS. 4 to 12 are sectional views sequentially illustrating a method of fabricating the PLC type optical amplifier 100.

Figure 4:
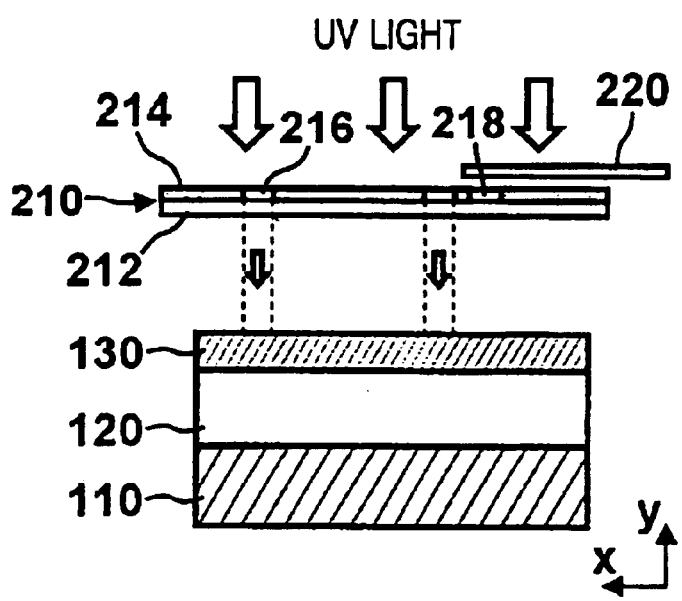
FIGS. 4 to 12 are sectional views sequentially illustrating a method of fabricating the PLC type optical amplifier illustrated in FIG. 2.

Referring to FIG. 4, the lower clad layer 120 and a photoresist layer 130 are sequentially deposited on the semiconductor substrate 110. Although other ways of formation are possible, the lower clad layer 120 is preferably formed by flame hydrolysis deposition (FHD) and sintering. The semiconductor substrate 110 and the lower clad layer 120 are formed of silica. CVD (Chemical Vapor Deposition) such as PECVD (Plasma Enhanced CVD) and LPCVD (Low Pressure CVD), or FHD can be used for depositing the lower clad layer 120 on the semiconductor substrate 110. Preferably, the FHD method is used.

The photoresist layer 130 is formed to a predetermined thickness on the lower clad layer 120 by applying liquid photoresist onto the lower clad layer 120 and then rotating the semiconductor substrate 110 at high speed.

Figure 5:
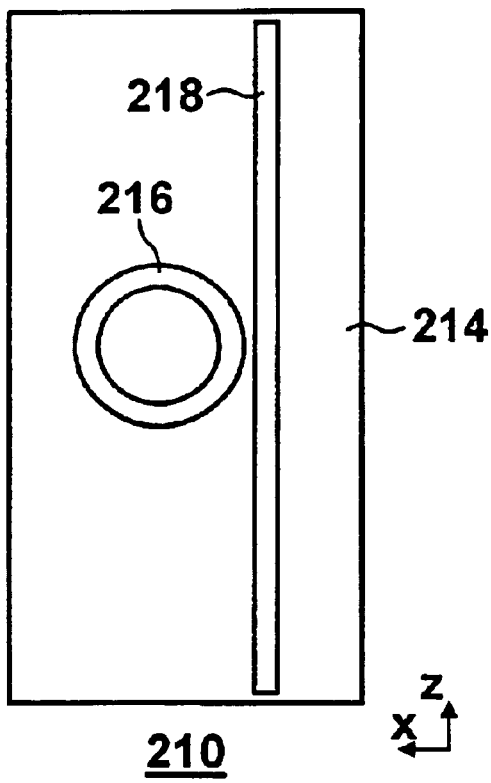

FIG. 5 is a perspective view of an amplitude mask 210 illustrated in FIG. 4. Referring to FIGS. 4 and 5, the amplitude mask 210 having an annular first slit 216 and a linear waveguide-shaped second slit 218 is placed on the photoresist layer 130 and then irradiated with UV (UltraViolet) light. UV light incident on the second slit 218 is blocked by a first screen 220. The amplitude mask 210 passes UV light incident on the first slit 216, blocking UV light incident on the remaining area 214. UV light passed through the first slit 216 is projected onto the photoresist layer 130. After etching, the photoresist layer 130 as illustrated in FIG. 6 is obtained.

Figure 6:
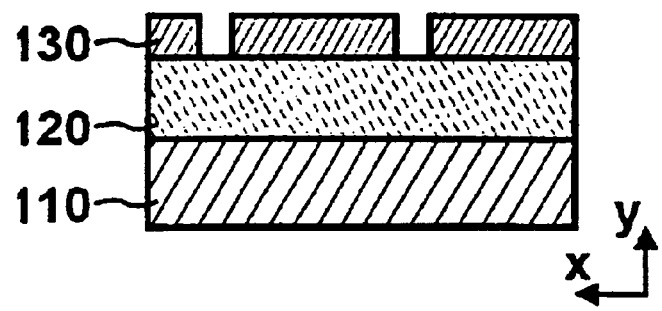

Referring to FIG. 6, a groove such as the first slit 216 illustrated in FIG. 5 is formed in the photoresist layer 130, with a portion of the upper surface of the lower clad layer 120 exposed.

Figure 7:
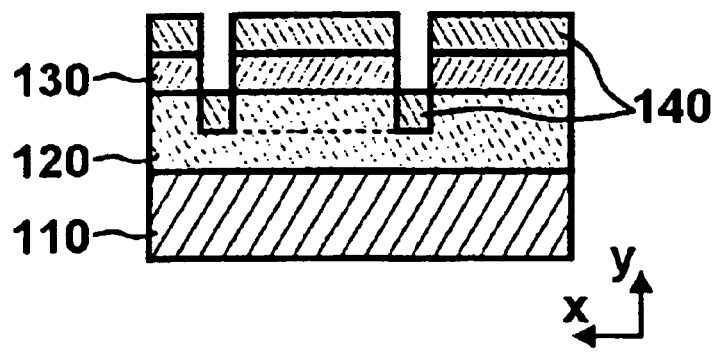

Referring to FIG. 7, the lower clad layer 120 is etched to a predetermined depth using the photoresist layer 130 by Reactive Ion Etching (RIE), for example and the erbium-doped silica amplification layer 140 is formed in the etched portions of the lower clad layer 120 by the FHD and sintering.

Figure 8:
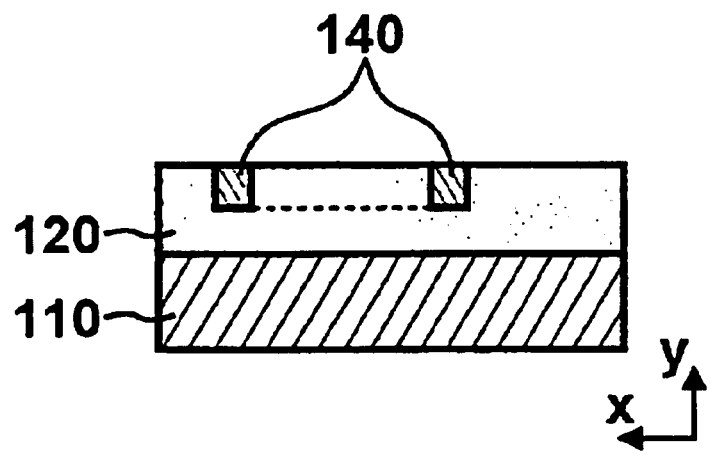

Referring to FIG. 8, the photoresist layer 130 is etched away using a photoresist remover. During the etching, the amplification layer 140 deposited on the photoresist layer 130 is also removed.

Figure 9:
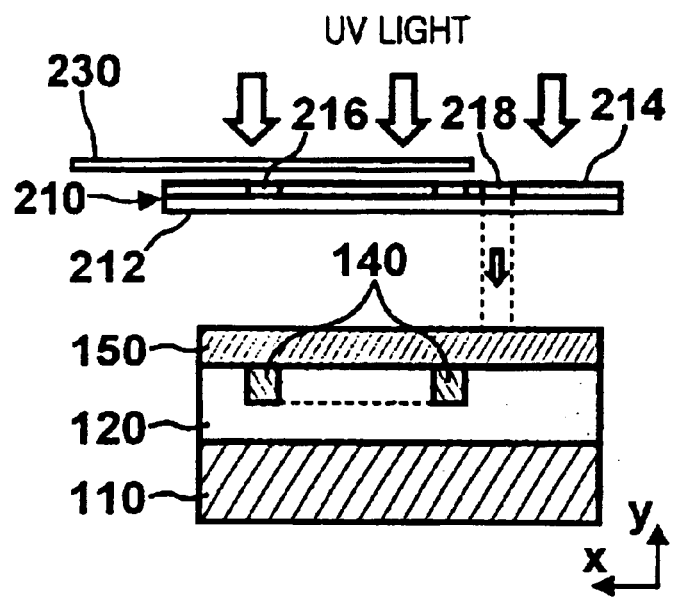

Referring to FIG. 9, a photoresist layer 150 is deposited on the amplification layer 140 and the exposed upper surface of the lower clad layer 120 and the mask 210 shown in FIG. 5 is placed on the photoresist layer 150. UV light incident on the first slit 216 is blocked by a second screen 230.

The amplitude mask 210 passes UV light incident on the second slit 218, blocking UV light incident on the remaining area 214. UV light passing through the second slit 218 is projected onto the photoresist layer 150. After etching, the photoresist layer 150 as shown in FIG. 10 is obtained.

Figure 10:
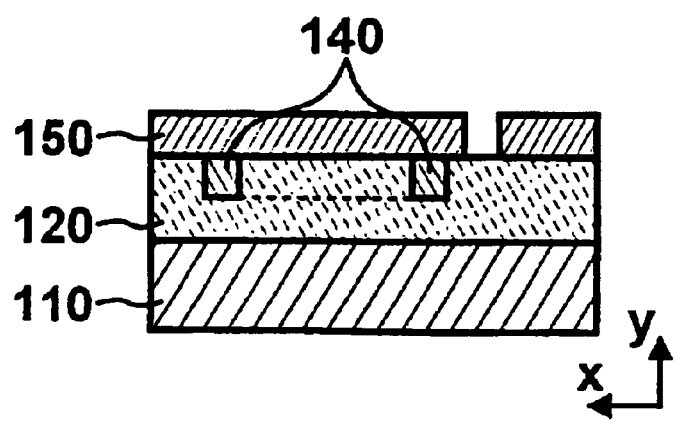

Referring to FIG. 10, a groove similar to the second slit 218 illustrated in FIG. 5 is formed in the photoresist layer 150, with a portion of the upper surface of the lower clad layer 120 exposed.

Figure 11:
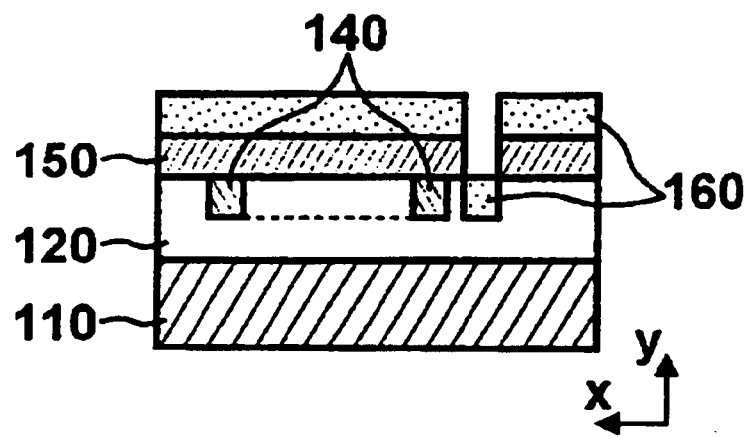

Referring to FIG. 11, the lower clad layer 120 is etched to the depth of the amplification layer 140 using the photoresist layer 150 by RIE, for example, and the silica core layer 160 is formed in the etched portion of the lower clad layer 120 by the FHD and sintering.

Figure 12:
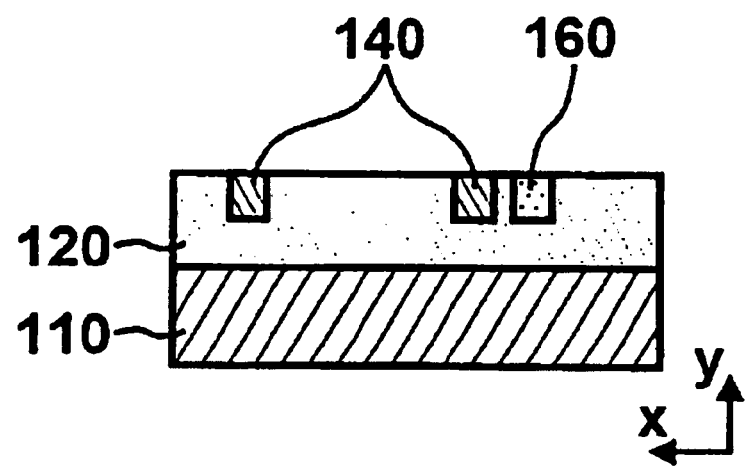

Referring to FIG. 12, the photoresist layer 150 is etched away using a photoresist remover. During the etching, the core layer 160 deposited on the photoresist layer 150 is also removed.

Subsequently, the upper clad layer 170 formed of the same material as for the lower clad layer 120 is deposited on the exposed surfaces of the amplification layer 140, the core layer 160, and the lower clad layer 120. Then, the PLC type optical amplifier 100 as shown in FIG. 2 is achieved.

In accordance with the present invention as described above, the PLC type optical amplifier amplifies an optical signal coupled from the core layer using an annular amplification layer and re-couples the amplified optical signal to the core layer. By repeating this amplification operation, a high amplification rate and high integration can be realized.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A Planar Lightwave Circuit (PLC) type optical amplifier comprising:

a semiconductor substrate;

a lower clad layer deposited on the semiconductor substrate;

a core layer deposited on the lower clad layer, for propagating an optical signal;

an amplification layer deposited on the lower clad layer and adjacent the core layer, said amplification layer forming an annular light path and amplifying an optical signal coupled inward from the core layer along the annular light path;

wherein the amplification layer is formed of erbium-doped silica to have an annular shape having a predetermined radius; and an upper clad layer deposited on the amplification layer, so that said lower clad layer and said upper clad layer surround the core layer and amplification layer.

2. The PLC type optical amplifier of claim 1, wherein the amplification layer is formed of a light amplifying material.

3. The PLC type optical amplifier of claim 2, wherein the amplification layer adjacent the core layer is, spaced from the core layer by a predetermined amount so as to form a coupling region C therebetween.

4. The PLC type optical amplifier according to claim 2, wherein the amplification layer is formed of erbium-doped silica to have an annular shape having a predetermined radius.

5. The PLC type optical amplifier according to claim 3, wherein the amplification layer is formed of erbium-doped silica to have an annular shape having a predetermined radius.

6. The PLC type optical amplifier according to claim 3, wherein a coupling coefficient t of the optical signal passing through the coupling region C of the core layer is predetermined by a distance W between the core layer and amplification layer, and a refractive index distribution of the coupling region C defined by: (a) the core layer, (b) the amplification layer, (c) the lower clad layer, and a length of the coupling region C.

7. The PLC type optical amplifier according to claim 6, wherein when the coupling coefficient t is approximately 1, an effective amplification rate $G_{eff}$ of the amplification layer is expressed by:

$$G_{eff}=G/[1-rG]$$

wherein r (=1−t) is a non-coupling coefficient, G is a gain rate, and r is a predetermined value selected so that an effective amplification rate $G_{eff}$ that is greater than the gain rate G.

8. The PLC type optical amplifier according to claim 1, wherein the lower clad layer and the semiconductor substrate are comprised of silica.

9. The PLC type optical amplifier according to claim 1, wherein the lower clad layer is deposited on the semiconductor substrate by Chemical Vapor Deposition (CVD).

10. A Planar Lightwave Circuit (PLC) type optical amplifier comprising:
   a semiconductor substrate;
   a core layer arranged on the semiconductor substrate, for propagating an optical signal;
   an amplification layer arranged on the semiconductor substrate for forming an annular light path and amplifying an optical signal coupled inward from the core layer along the annular light path;
   wherein the amplification layer is formed of erbium-doped silica to have an annular shape having a predetermined radius; and
   a clad layer surrounding the core layer and the amplification layer so as to be arranged between the core layer and the semiconductor substrate to confine a path of the optical signal to the core layer and amplification layer.

11. The PLC type optical amplifier of claim 10, wherein the amplification layer is formed of a light amplifying material.

12. The PLC type optical amplifier of claim 11, wherein the amplification layer is arranged on the semiconductor substrate at a side of the core layer, spaced from the core layer.

13. The PLC type optical amplifier of claim 11, wherein the amplification layer is formed of erbium-doped silica to have an annular shape having a predetermined radius.

14. The PLC type optical amplifier of claim 12 wherein the amplification layer is formed of erbium-doped silica to have an annular shape having a predetermined radius.

15. The PLC type optical amplifier according to claim 10, wherein a coupling coefficient t of the optical signal passing through the coupling region C of the core layer is predetermined by a distance W between the core layer and amplification layer, and a refractive index distribution of the coupling region C defined by: (a) the core layer, (b) the amplification layer, (c) a lower portion of the clad layer, and a length of the coupling region C.

16. The PLC type optical amplifier according to claim 15, wherein when the coupling coefficient t is approximately 1, an effective amplification rate $G_{eff}$ of the amplification layer is expressed by:

$$G_{eff}=G/[1-G]$$

wherein r (=1−t) is a non-coupling coefficient, G is a gain rate, and r is a predetermined value selected so that an effective amplification rate $G_{eff}$ that is greater than the gain rate G.

17. A method for providing a PLC type optical amplifier, comprising the steps of:
   (a) providing a semiconductor substrate;
   (b) depositing a lower clad layer on the semiconductor substrate;
   (c) depositing a core layer on the lower clad layer for propagating an optical signal;
   (d) depositing an amplification layer on the lower clad layer and adjacent the core layer, said amplification layer forming an annular light path and amplifying an optical signal coupled inward from the core layer along the annular light path, wherein the amplification layer is formed of erbium-doped silica and has an annular shape with a predetermined radius; and
   (e) depositing an upper clad layer on the amplification layer, so that said lower clad layer and said upper clad layer surround the core layer and amplification layer.

18. The method according to claim 17, wherein the amplification layer deposited in step (d) is adjacent the core layer deposited in step (c) so that the amplification layer is spaced from the core layer by a predetermined amount so as to form a coupling region C therebetween.

19. The method according to claim 18, wherein a coupling coefficient t of the optical signal passing through the coupling region C of the core layer is predetermined by a distance W between the core layer and amplification layer, and a refractive index distribution of the coupling region C defined by: (a) the core layer, (b) the amplification layer, (c) a lower portion of the clad layer, and a length of the coupling region C.

20. The method according to claim 19, further comprising setting the coupling coefficient t is approximately 1, and providing an effective amplification rate $G_{eff}$ of the amplification layer by:

$$G_{eff}=G/1-rG]$$

wherein r(=1−t) is a non-coupling coefficient, G is a gain rate, and r is a predetermined value selected so that an effective amplification rate $G_{eff}$ that is greater than the gain rate G.

* * * * *